US012764702B2

(12) United States Patent
Nam et al.

(10) Patent No.: US 12,764,702 B2
(45) Date of Patent: Oct. 13, 2026

(54) METHOD OF TRANSCEIVING SIDELINK POSITIONING PROTOCOL MESSAGE IN WIRELESS COMMUNICATION SYSTEM AND APPARATUS THEREOF

(71) Applicant: LG Electronics Inc., Seoul (KR)

(72) Inventors: Jonggil Nam, Seoul (KR); Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 18/417,872

(22) Filed: Jan. 19, 2024

(65) Prior Publication Data

US 2024/0276423 A1 Aug. 15, 2024

(30) Foreign Application Priority Data

Jan. 20, 2023 (KR) ........................ 10-2023-0009015

(51) Int. Cl.

| | |
|---|---|
| ***H04W 64/00*** | (2009.01) |
| ***H04L 5/00*** | (2006.01) |
| ***H04W 56/00*** | (2009.01) |
| *H04W 92/18* | (2009.01) |

(52) U.S. Cl.

CPC ........... *H04W 64/00* (2013.01); *H04L 5/0053* (2013.01); *H04W 56/0015* (2013.01); *H04W 92/18* (2013.01)

(58) Field of Classification Search

CPC . H04W 64/00; H04W 56/0015; H04W 92/18; H04L 5/0053

See application file for complete search history.

(56) References Cited

U.S. PATENT DOCUMENTS 9,906,996 B2 * 2/2018 Lou ................. H04W 36/00224
2010/0013701 A1 * 1/2010 Fischer ................. H04W 64/00 342/357.43
2013/0053034 A1 * 2/2013 Lee ....................... H04L 67/148 455/436

(Continued)

FOREIGN PATENT DOCUMENTS

WO WO 2022/216345 10/2022

OTHER PUBLICATIONS

International Search Report and Written Opinion in International Appln. No. PCT/KR2024/000910, mailed on Apr. 30, 2024, 9 pages (with English translation).

(Continued)

*Primary Examiner* — Mohamed Barakat
(74) *Attorney, Agent, or Firm* — Fish & Richardson P.C.

(57) ABSTRACT

The present disclosure relates to a method of performing sidelink positioning for a User Equipment (UE) in a wireless communication system. In particular, the method includes the steps of: configuring at least one SLPP (Sidelink Positioning Protocol) session with at least one target UE; generating a SLPP message related to the at least one SLPP session; and transmitting the SLPP message to the at least one target UE, wherein the SLPP message includes at least one SLPP session identifier for identifying the at least one SLPP session and at least one SLPP transaction identifier for identifying the at least one SLPP transaction belonging to the at least one SLPP session.

11 Claims, 15 Drawing Sheets

(56) References Cited

U.S. PATENT DOCUMENTS

| | | | | |
|---|---|---|---|---|
| 2014/0256323 | A1* | 9/2014 | Edge | H04W 64/00 455/436 |
| 2020/0314916 | A1* | 10/2020 | Park | H04W 72/04 |
| 2021/0360371 | A1* | 11/2021 | Qiao | H04W 4/029 |
| 2022/0229146 | A1* | 7/2022 | Ko | G01S 5/02216 |
| 2022/0236365 | A1 | 7/2022 | Ko et al. | |
| 2022/0361142 | A1 | 11/2022 | Ko et al. | |

OTHER PUBLICATIONS

Qualcomm Incorporated, "Study of Sidelink Positioning Architecture, Signaling and Procedures," 3GPP TSG RAN WG2 Meeting #119bis-e, R2-2210363, E-meeting, Oct. 10-19, 2022, 28 pages.

* cited by examiner

METHOD OF TRANSCEIVING SIDELINK POSITIONING PROTOCOL MESSAGE IN WIRELESS COMMUNICATION SYSTEM AND APPARATUS THEREOF

CROSS-REFERENCE TO RELATED APPLICATION

This application claims the benefit of Korean Application No. 10-2023-0009015, filed on Jan. 20, 2023. The disclosure of the prior application is incorporated by reference in its entirety.

TECHNICAL FIELD

The present disclosure relates to a wireless communication system, and more particularly, to a method and apparatus for transmitting and receiving a sidelink positioning protocol message in a wireless communication system.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

SUMMARY

Based on the foregoing discussion, the present disclosure proposes a method and apparatus for transmitting and receiving a sidelink positioning protocol message in a wireless communication system The objects to be achieved with the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, provided herein is a method performed by a user equipment (UE) in a wireless communication system. The method may include: establishing at least one sidelink positioning protocol (SLPP) session with at least one target UE; generating an SLPP message related to the at least one SLPP session; and transmitting the SLPP message to the at least one target UE. A header of the SLPP message may include at least one SLPP session identifier for identifying the at least one SLPP session and at least one SLPP transaction identifier for identifying at least one SLPP transaction belonging to the at least one SLPP session.

In another aspect of the present disclosure, provided herein is a UE in a wireless communication system. The UE may include: at least one transceiver; at least one processor; and at least one computer memory operably connected to the at least one processor and storing instructions that, when executed, cause the at least one processor to perform operations. The operations may include: establishing at least one SLPP session with at least one target UE; generating an SLPP message related to the at least one SLPP session; and transmitting the SLPP message to the at least one target UE. A header of the SLPP message may include at least one SLPP session identifier for identifying the at least one SLPP session and at least one SLPP transaction identifier for identifying at least one SLPP transaction belonging to the at least one SLPP session.

In another aspect of the present disclosure, provided herein is a processing device in a wireless communication system. The processing device may include: at least one processor; and at least one computer memory operably connected to the at least one processor and storing instructions that, when executed, cause the at least one processor to perform operations. The operations may include: establishing at least one SLPP session with at least one target UE; generating an SLPP message related to the at least one SLPP session; and transmitting the SLPP message to the at least one target UE. A header of the SLPP message may include at least one SLPP session identifier for identifying the at least one SLPP session and at least one SLPP transaction identifier for identifying at least one SLPP transaction belonging to the at least one SLPP session.

In another aspect of the present disclosure, provided herein is a computer-readable storage medium. The computer-readable storage medium may be configured to store at least one computer program including instructions that, when executed by at least one processor, cause the at least one processor to perform operations for a UE. The operations may include: establishing at least one SLPP session with at least one target UE; generating an SLPP message related to the at least one SLPP session; and transmitting the SLPP message to the at least one target UE. A header of the SLPP message may include at least one SLPP session identifier for identifying the at least one SLPP session and at least one SLPP transaction identifier for identifying at least one SLPP transaction belonging to the at least one SLPP session.

Preferably, information on the at least one SLPP session identifier may be provided in advance to one or more UEs participating in the at least one SLPP session, including the at least one target UE.

Preferably, if there are a plurality of SLPP sessions, an SLPP transaction related to a first SLPP session and an SLPP transaction related to a second SLPP session may be distinguished by the SLPP session identifier of each SLPP session. If the first and second SLPP sessions have the same SLPP session identifier, the SLPP transaction related to the first SLPP session and the SLPP transaction related to the second SLPP session may be distinguished by the SLPP transaction identifier of each SLPP transaction. More preferably, the SLPP transaction related to the first SLPP session and the SLPP transaction related to the second SLPP session may be performed in parallel.

Preferably, the header of the SLPP message may further include at least one of an end flag of the at least one SLPP transaction, a sequence number of the SLPP message, or an acknowledgement (ACK) response request indicator of the SLPP message.

The foregoing solutions are merely a part of the examples of the present disclosure and various examples into which the technical features of the present disclosure are incorporated may be derived and understood by persons skilled in the art from the following detailed description.

According to the present disclosure, wireless signal transmission and reception may be efficiently performed in wireless communication systems.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure, illustrate embodiments of the present disclosure and together with the description serve to explain the principle of the present disclosure.

DETAILED DESCRIPTION

Figure 1:
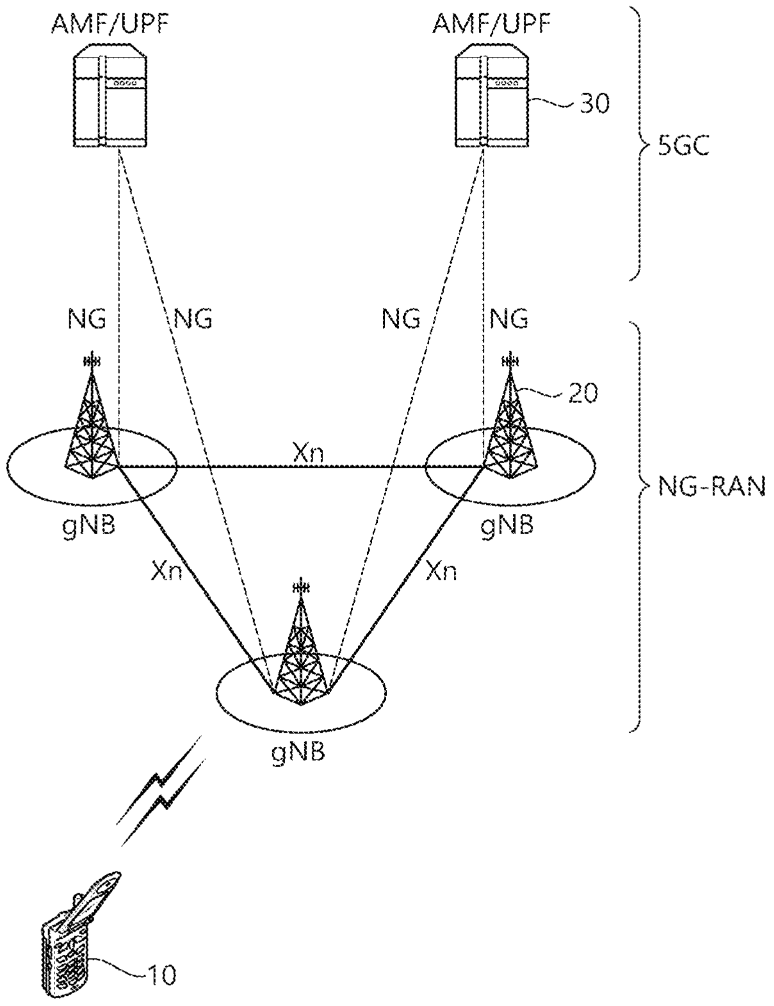
FIG. 1 is a diagram illustrating the structure of a new radio (NR) system.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

As more and more communication devices require greater communication capacity, there is a growing need for enhanced Mobile Broadband Communications (eMBB) improved over the current radio access technology (RAT). In addition, massive Machine Type Communications (MTC) that connects numerous devices and objects to provide various services anytime and anywhere is also considered a key issue in next-generation communications. Additionally, discussions are underway regarding communication system designs in consideration of services and/or UEs sensitive to reliability and latency. The introduction of next-generation RATs such as eMBB, massive MTC, Ultra Reliable and Low Latency Communications (URLLC) is being discussed. In this document, the corresponding technology will be referred to as New Radio or New RAT (NR) for convenience of description.

For the sake of clarity, the present disclosure primarily focuses on 3GPP NR, but the technical ideas of the present disclosure are not limited thereto.

In this specification, the term "set/setting" may be replaced with the term "configure/configuration", and both terms may be used interchangeably. A conditional expression (e.g., "if", "in a case", or "when") may be replaced by "based on that" or "in a state/status." In addition, operations and software/hardware (SW/HW) configurations of a user equipment/base station (UE/BS) may be derived/understood based on satisfaction of related conditions. If a process on a receiving (or transmitting) side is capable of being derived/ understood from a process on a transmitting (or receiving) side in signal transmission/reception between wireless communication devices (e.g., BS, UE, etc.), description thereof may be omitted. Signal determination/generation/encoding/transmission at the transmitting side, for example, may be understood as signal monitoring reception/decoding/determination at the receiving side. When it is said that the UE performs (or does not perform) a specific operation, it may be interpreted to mean that the BS expects/assumes (or does not expect/assume) that the UE will perform the specific operation. When it is said that the BS performs (or does not perform) a specific operation, it may be interpreted to mean that the UE expects/assumes (or does not expect/assume) that the BS will perform the specific operation. In the following description, the classification and indexing of sections, embodiments, examples, options, methods, schemes, and so on are merely for convenience of description, but it does not imply that each necessarily constitutes an independent disclosure or should be implemented separately. Furthermore, in describing each section, embodiment, example, option, method, solution, and so on if there is no explicit conflict, it may be inferred or understood that at least some of the sections, embodiments, examples, options, methods, solutions, and so on may be implemented in combination or may be omitted in implementation.

FIG. 1 illustrates the structure of a NR system.

Referring to FIG. 1, a next-generation radio access network (NG-RAN) may include a BS 20 that provides user plane and control plane protocol termination to a UE 10. For example, the BS 20 may include a next-generation Node B (gNB) and/or an evolved Node B (eNB). The UE 10 may have fixed or mobile characteristics. The UE 10 may be referred to by other terms such as a mobile station (MS), user terminal (UT), subscriber station (SS), mobile terminal (MT), or wireless device. For example, the BS 20 may be a fixed station communicating with the UE 10. The BS 10 may be referred to by other terms such as a base transceiver system (BTS), access point, and so on.

FIG. 1 shows an example in which a gNB alone is included. The BSs 20 may be connected to each other via an Xn interface. The BS 20 may be connected to a 5th generation core network (5GC) via an NG interface. Specifically, the BS 20 may be connected to an access and mobility management function (AMF) 30 through an NG-C interface and connected to a user plane function (UPF) 30 through an NG-U interface.

Figure 2:
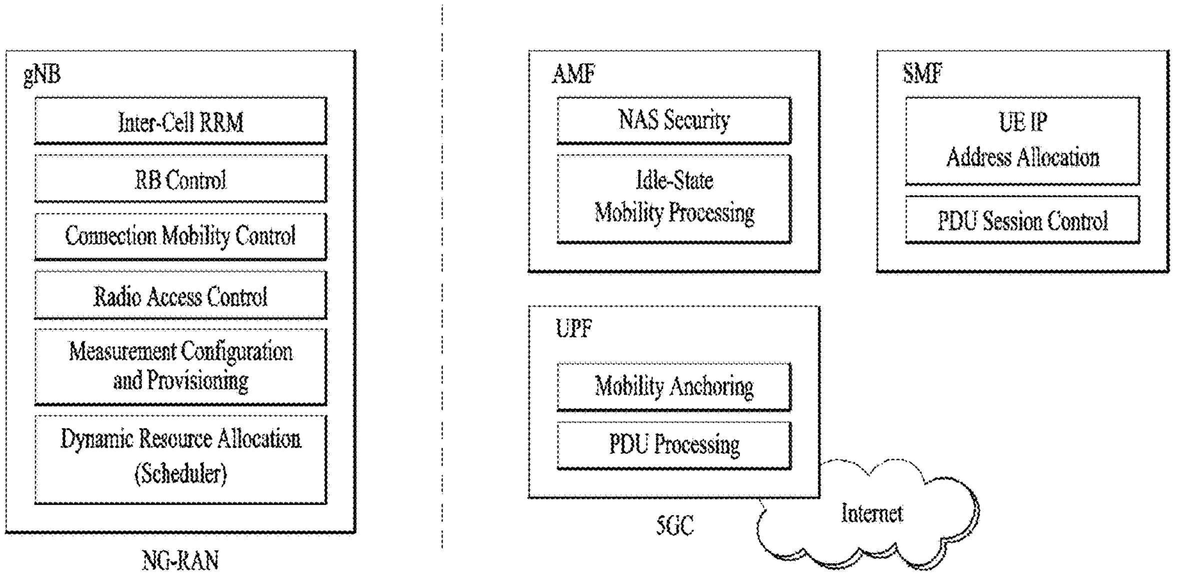
FIG. 2 is a diagram illustrating functional split between a next generation radio access network (NG-RAN) and a 5th generation core network (5GC)

FIG. 2 illustrates functional split between the NG-RAN and the 5GC.

Referring to FIG. 2, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
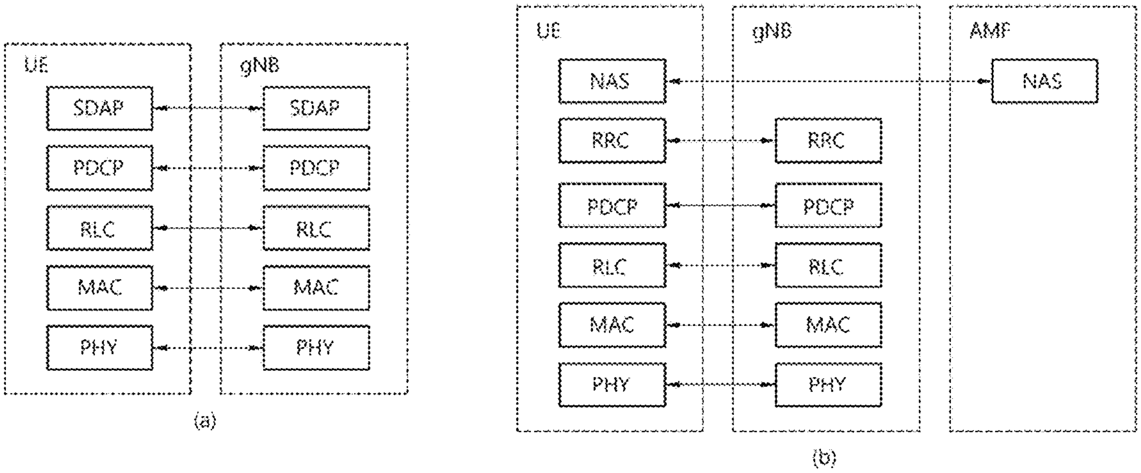
FIG. 3 illustrates a radio protocol architecture of the NR system.

FIG. 3 illustrates a radio protocol architecture of the NR system. Specifically, FIG. 3(*a*) illustrates a user-plane radio protocol architecture, and FIG. 3(*b*) illustrates a control-plane radio protocol architecture. A user plane is a protocol stack for user data transmission, and a control plane is a protocol stack for control signal transmission.

Referring to FIG. 3, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

A service data adaptation protocol (SDAP) layer is only defined in the user plane. The SDAP layer performs functions such as mapping between QoS flows and data radio bearers as well as marking QoS flow identifiers (IDs) within DL and UL packets.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
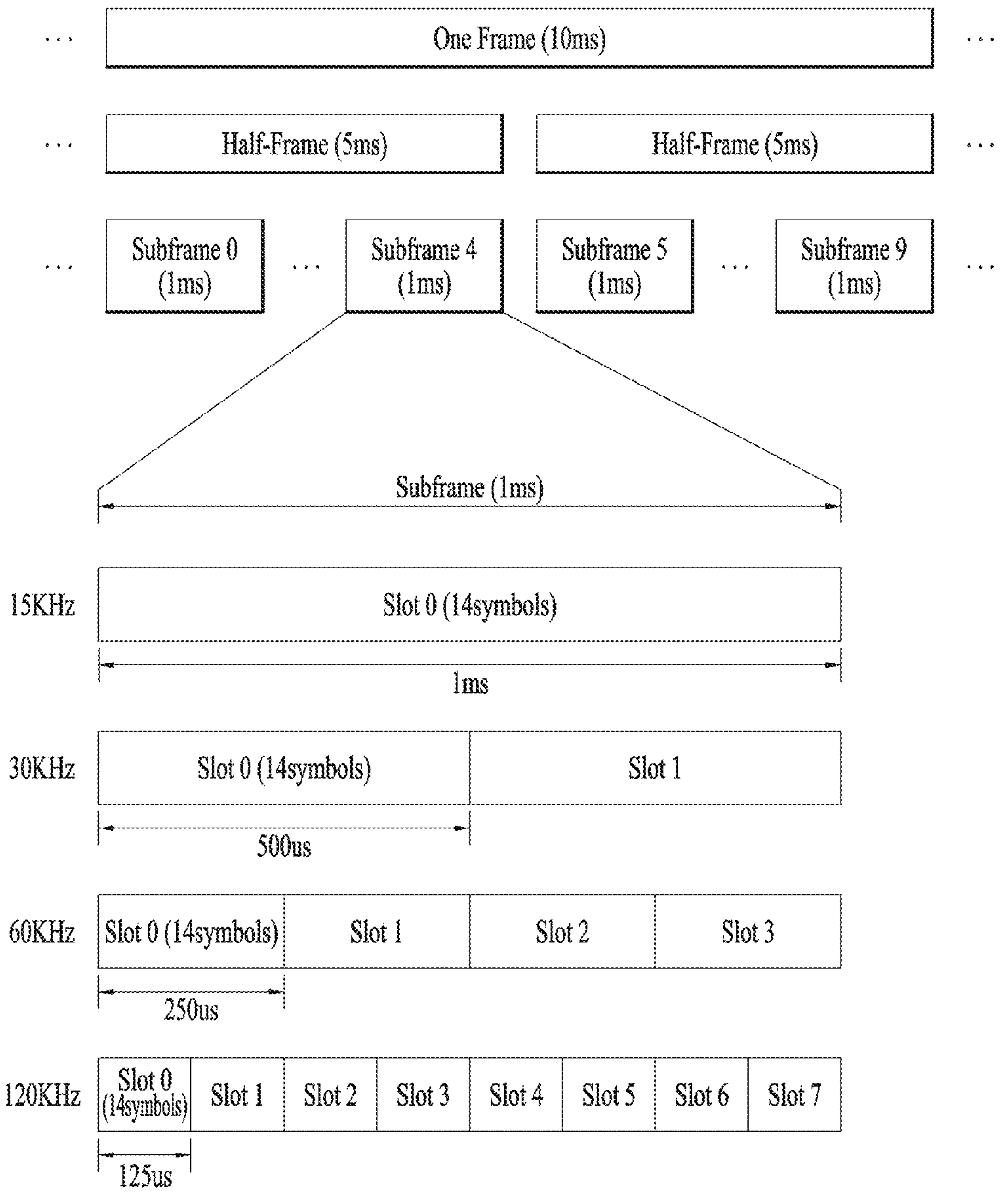
FIG. 4 illustrates a radio frame structure in NR system.

FIG. 4 illustrates a radio frame structure in NR system.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP). In a normal CP (NCP) case, each slot may include 14 symbols, whereas in an extended CP (ECP) case, each slot may include 12 symbols.

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration in the NCP case.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 below lists the number of symbols per slot ($N^{slot}_{symb}$), the number of slots per frame ($N^{frame,u}_{slot}$), and the number of slots per subframe ($N^{subframe,u}_{slot}$) according to an SCS in the ECP case.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 5:
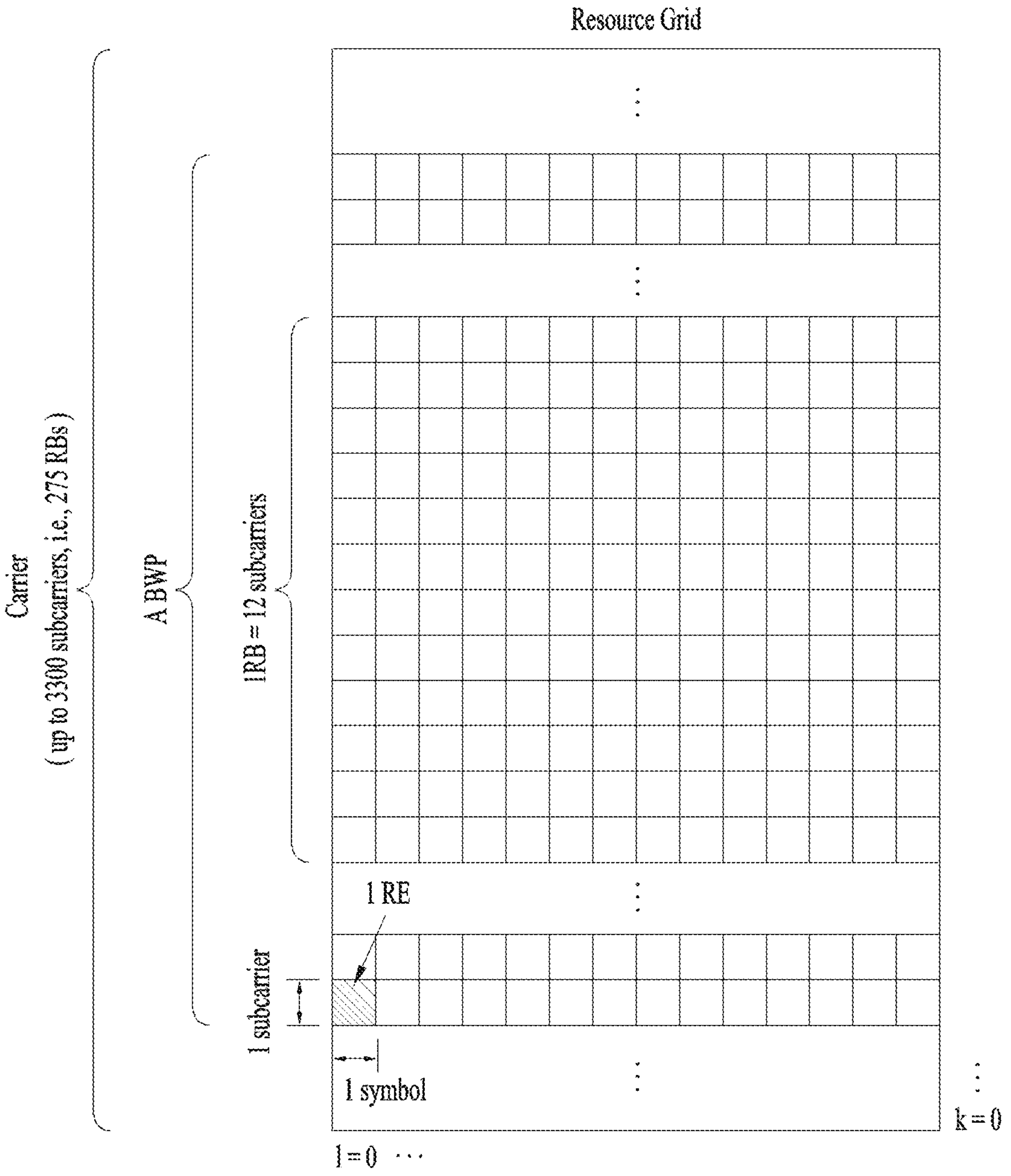
FIG. 5 illustrates a resource grid of a slot in the NR system.

FIG. 5 illustrates a resource grid of a slot in the NR system.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

Figure 6:
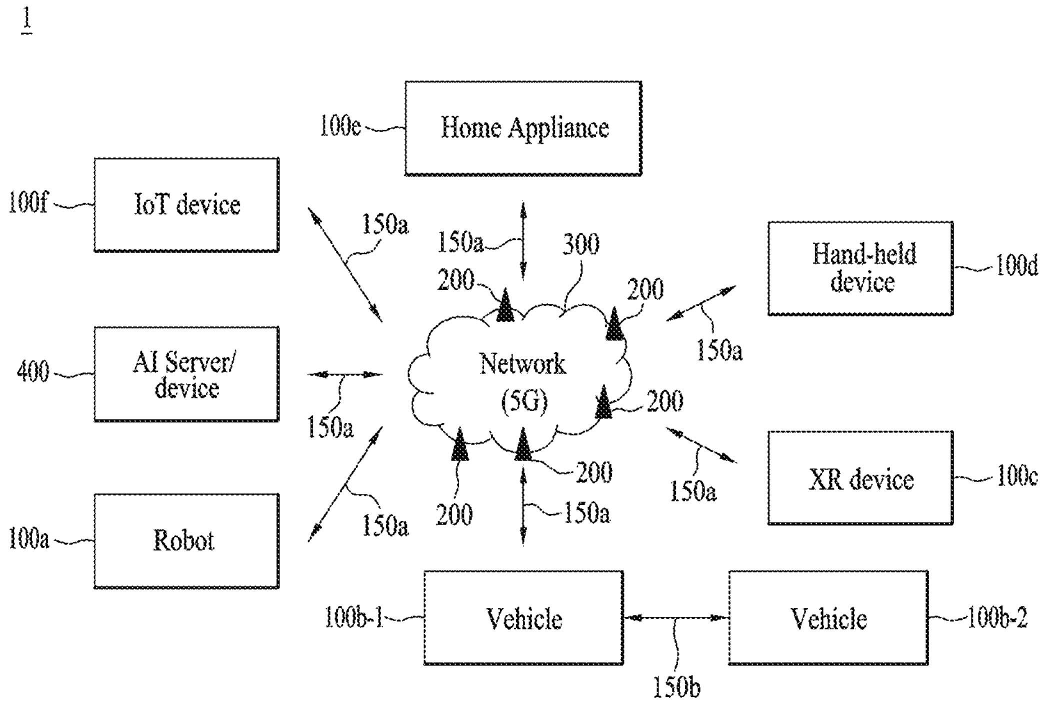
FIG. 6 illustrates an example of a communication system 1 to which implementations of the present disclosure is applied.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Only one BWP can be activated for one UE. For each element may be referred to as a resource element (RE) in a resource grid, to which one complex symbol may be mapped. FIG. 6 illustrates an example of a communication system 1 to which implementations of the present disclosure is applied.

Referring to FIG. 6, the communication system 1 includes wireless devices, base stations (BSs), and a network. The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as UL/DL communication 150*a*, sidelink communication 150*b* (or, D2D communication), or inter BS communication (e.g., relay, integrated access backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 7:
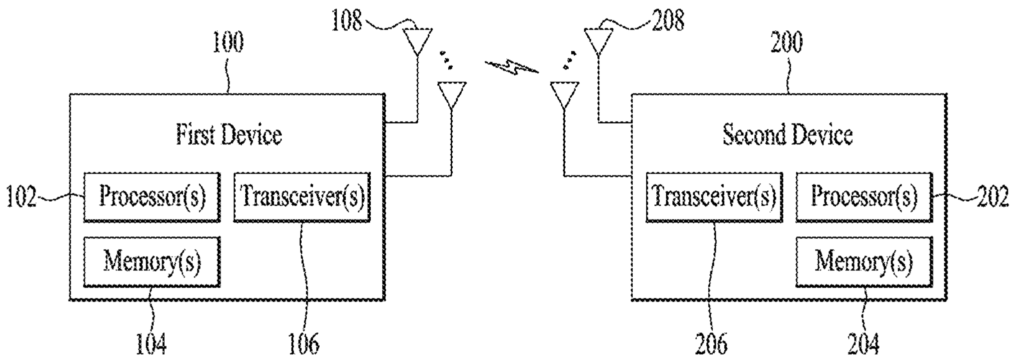
FIG. 7 and FIG. 8 illustrate wireless devices applicable to the present disclosure.

FIG. 7 illustrates wireless devices applicable to the present disclosure.

Referring to FIG. 7, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 6.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 8:
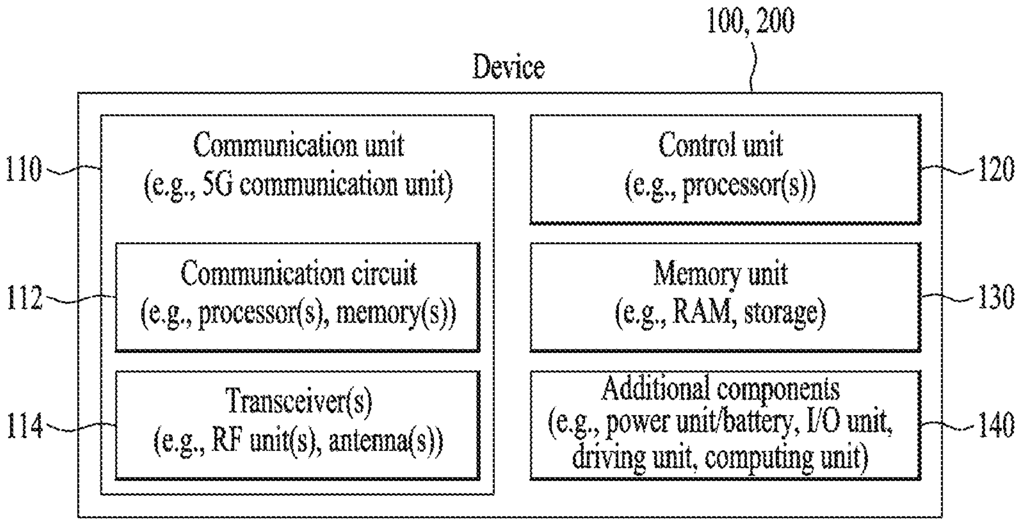

FIG. 8 illustrates another example of a wireless device which can perform implementations of the present disclosure. The wireless device may be implemented in various forms according to a use-case/service (refer to FIG. 6).

Referring to FIG. 8, wireless devices 100 and 200 may correspond to the wireless devices 100 and 200 of FIG. 7 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 7 and/or the one or more memories 104 and 204 of FIG. 7. For example, the transceiver(s) 114 may include the one or more transceivers 106 and 206 of FIG. 2 and/or the one or more antennas 108 and 208 of FIG. 7. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g., audio I/O port, video I/O port), a driving unit, and a computing unit. The wireless device may be implemented in the form of, without being limited to, the robot (100*a* of FIG. 6), the vehicles (100*b*-1 and 100*b*-2 of FIG. 6), the XR device (100*c* of FIG. 6), the hand-held device (100*d* of FIG. 6), the home appliance (100*e* of FIG. 6), the IoT device (100*f* of FIG. 6), a digital broadcast terminal, a hologram device, a public safety device, an MTC device, a medicine device, a Fintech device (or a finance device), a security device, a climate/environment device, the AI server/device (400 of FIG. 6), the BSs (200 of FIG. 6), a network node, etc. The wireless device may be used in a mobile or fixed place according to a use-example/service.

In FIG. 8, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 9:
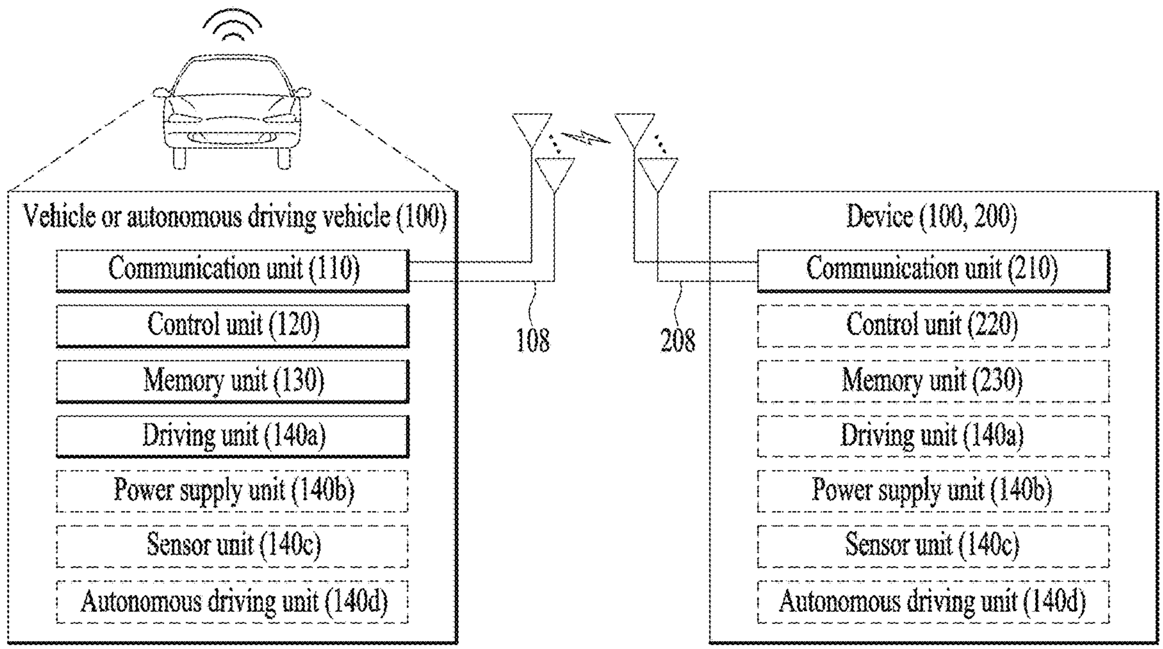
FIG. 9 illustrates a vehicle or an autonomous driving vehicle applied to the present disclosure.

FIG. 9 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 9, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. Blocks 110/130/140*a*-140*d* correspond to Blocks 110/130/140 of FIG. 8, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Now, a description will be given of V2X or SL communication.

Figure 10A:
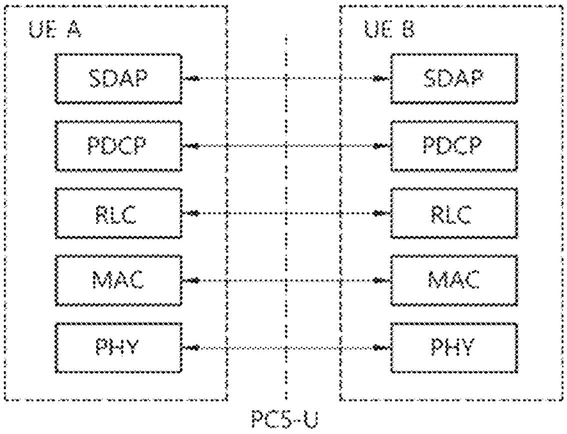
FIGS. 10A and 10B illustrate radio protocol architectures for sidelink (SL) communication.
Figure 10B:
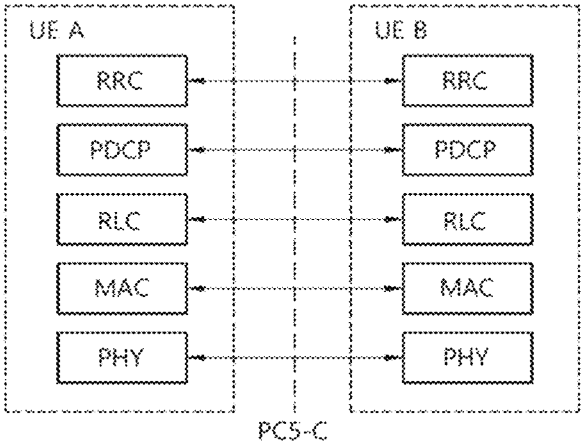

FIGS. 10A and 10B illustrate radio protocol architectures for SL communication. Specifically, FIG. 10A illustrates a user-plane protocol stack in NR, and FIG. 10B illustrates a control-plane protocol stack in NR.

Hereinafter, a sidelink synchronization signal (SLSS) and synchronization information will be described.

As an SL-specific sequence, the SLSS may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may use the S-PSS to detect an initial signal and obtain synchronization. In addition, the UE may use the S-PSS and the S-SSS to obtain detailed synchronization and detect a synchronization signal ID.

A physical sidelink broadcast channel (PSBCH) may be a (broadcast) channel for transmitting default (system) information that the UE needs to know first before SL signal transmission and reception. For example, the default information may include information related to an SLSS, a duplex mode (DM), a time division duplex (TDD) UL/DL configuration, information related to a resource pool, an application type related to the SLSS, a subframe offset, broadcast information, or the like. For example, for evaluation of PSBCH performance in NR V2X, the payload size of the PSBCH may be 56 bits including a CRC of 24 bits.

The S-PSS, S-SSS, and PSBCH may be included in a block format (e.g., SL synchronization signal (SS)/PSBCH block) supporting periodical transmission (hereinafter, the SL SS/PSBCH block is referred to as a sidelink synchronization signal block (S-SSB)). The S-SSB may have the same numerology (i.e., SCS and CP length) as that of a physical sidelink control channel (PSCCH)/physical sidelink shared channel (PSSCH) on a carrier, and the transmission bandwidth may exist within a configured (or preconfigured) SL BWP. For example, the S-SSB may have a bandwidth of 11 RBs. For example, the PSBCH may span 11 RBs. In addition, the frequency position of the S-SSB may be configured (in advance). Therefore, the UE does not need to perform hypothesis detection on frequency to discover the S-SSB in the carrier.

Hereinafter, synchronization acquisition of an SL UE will be described.

In TDMA and FDMA systems, accurate time and frequency synchronization are essential. If time and frequency synchronization are not accurate, system performance may be degraded due to inter-symbol interference (ISI) and inter-carrier interference (ICI) between symbols and subcarriers. The same is applied to V2X. In V2X, for time/frequency synchronization, an SLSS may be used at physical layers, while master information block-sidelink-V2X (MIB-SL-V2X) may be used at radio link control (RLC) layers.

Figure 11:
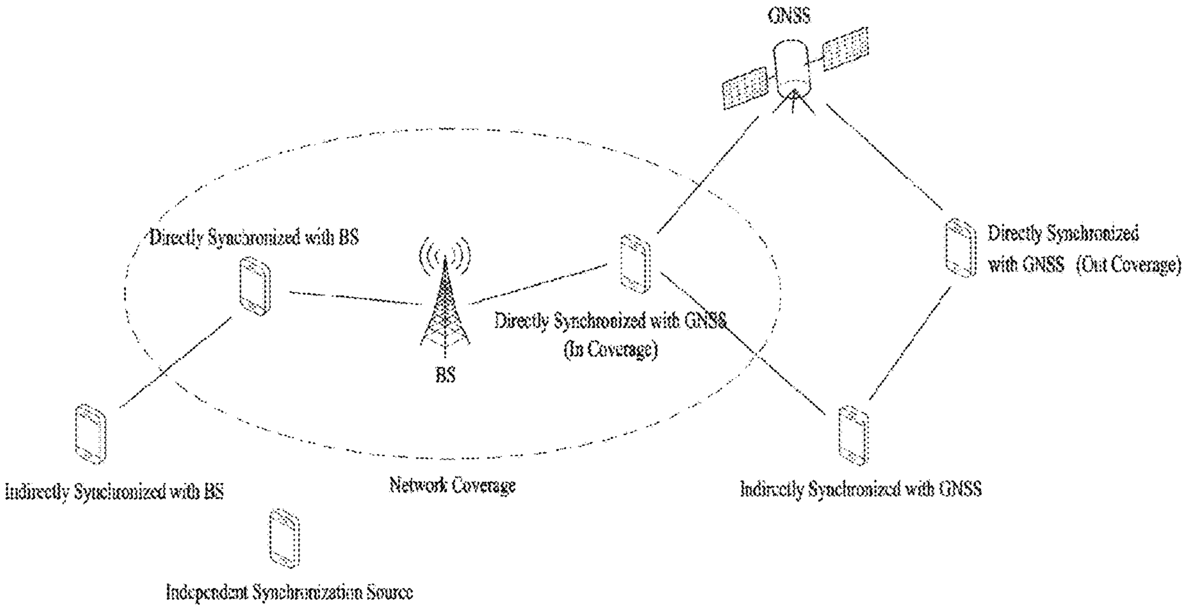
FIG. 11 illustrates a synchronization source or synchronization reference of vehicle-to-everything (V2X)

FIG. 11 illustrates a synchronization source or synchronization reference of V2X.

Referring to FIG. 11, in V2X, a UE may be directly synchronized with global navigation satellite systems (GNSS). Alternatively, the UE may be indirectly synchronized with the GNSS through another UE (within or out of network coverage). If the GNSS is configured as a synchronization source, a UE may calculate a direct frame number (DFN) and a subframe number using coordinated universal time (UTC) and a (pre)configured DFN offset.

Alternatively, a UE may be directly synchronized with a BS or may be synchronized with another UE that is synchronized in time/frequency with the BS. For example, the BS may be an eNB or a gNB. For example, when a UE is in network coverage, the UE may receive synchronization information provided by the BS and may be directly synchronized with the BS. Next, the UE may provide the synchronization information to another adjacent UE. If a timing of the BS is configured as a synchronization reference, the UE may follow a cell associated with a corresponding frequency (when the UE is in cell coverage in frequency) or a primary cell or a serving cell (when the UE is out of cell coverage in frequency), for synchronization and DL measurement.

The BS (e.g., serving cell) may provide a synchronization configuration for a carrier used for V2X/SL communication. In this case, the UE may conform to the synchronization configuration received from the BS. If the UE fails to detect any cell in the carrier used for V2X/SL communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference may be preconfigured for the UE. Alternatively, the synchronization source and the preference may be configured through a control message provided by the BS.

Whether to use GNSS-based synchronization or BS-based synchronization may be configured (in advance). In single-carrier operation, the UE may derive the transmission timing of the UE from an available synchronization reference with the highest priority.

For example, the UE may select (or reselect) a synchronization reference and obtain synchronization from the synchronization reference. In addition, the UE may perform SL communication (e.g., PSCCH/PSSCH transmission and reception, physical sidelink feedback channel (PSFCH) transmission and reception, S-SSB transmission and reception, reference signal transmission and reception, etc.) based on the acquired synchronization.

Figure 12A:
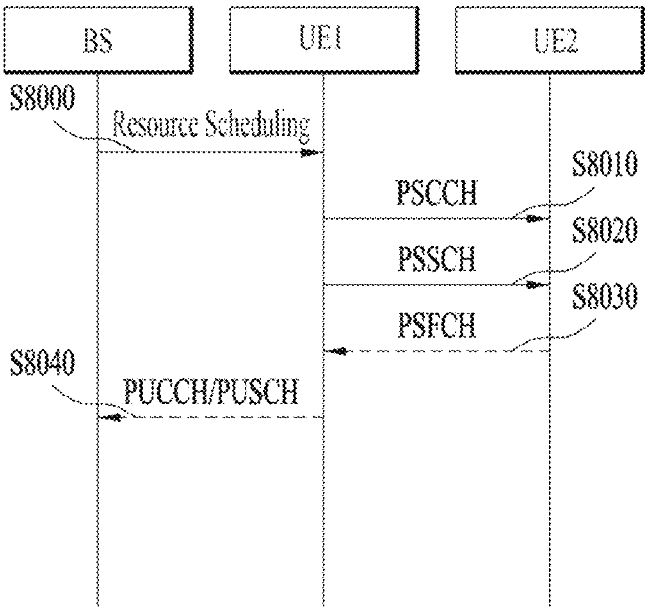
FIGS. 12A and 12B illustrate procedures of performing V2X or SL communication by a user equipment (UE) depending on a transmission mode.
Figure 12B:
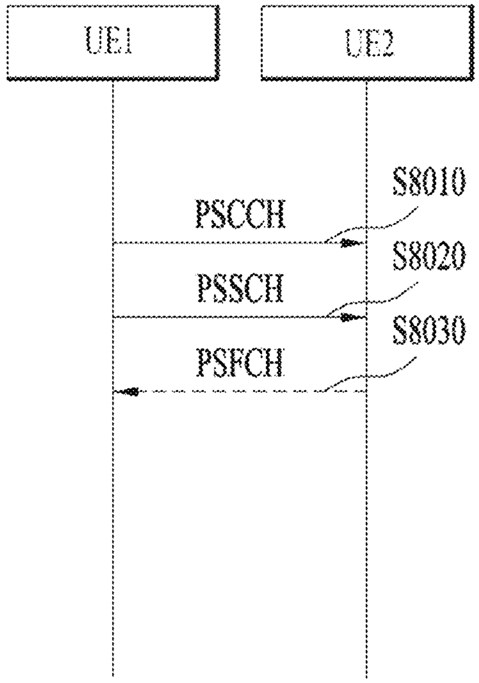

FIGS. 12A and 12B illustrate procedures of performing V2X or SL communication by a UE depending on a transmission mode. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 12A illustrates a UE operation related to LTE transmission mode 1 or LTE transmission mode 3. Alternatively, for example, FIG. 12A illustrates a UE operation related to NR resource allocation mode 1. For example, LTE transmission mode 1 may apply to general SL communication, and LTE transmission mode 3 may apply to V2X communication.

For example, FIG. 12B illustrates a UE operation related to LTE transmission mode 2 or LTE transmission mode 4. Alternatively, for example, FIG. 12B illustrates a UE operation related to NR resource allocation mode 2.

Referring to FIG. 12A, in LTE transmission mode 1, LTE transmission mode 3, or NR resource allocation mode 1, a BS may schedule an SL resource to be used for SL transmission by a UE. For example, in a step S8000, the BS may transmit information related to an SL resource and/or information related to a UE resource to a first UE. For example, the UL resource may include a PUCCH resource and/pr a PUSCH resource. For example, the UL resource may be a resource to report SL HARQ feedback to the BS.

For example, a first UE may receive information related to a Dynamic Grant (DG) resource and/or information related to a Configured Grant (CG) resource from a BS. For example, the CG resource may include a CG type 1 resource or a CG type 2 resource. In the present specification, the DG resource may be a resource that the BS configures/allocates to the first UE over Downlink Control Information (DCI). In the present specification, the CG resource may be a (periodic) resource configured/allocated by the BS to the first UE over a DCI and/or an RRC message. For example, in the case of the CG type 1 resource, the BS may transmit an RRC message including information related to the CG resource to the first UE. For example, in the case of the CG type 2 resource, the BS may transmit an RRC message including information related to the CG resource to the first UE, and the BS may transmit DCI related to activation or release of the CG resource to the first UE.

In a step S8010, the first UE may transmit PSCCH (e.g., Sidelink Control Information (SCI) or 1st-stage SCI) to a second UE based on the resource scheduling. In a step S8020, the first UE may transmit PSSCH (e.g., 2nd-stage SCI, MAC PDU, data, etc.) related to the PSCCH to the second UE. In a step S8030, the first UE may receive PSFCH related to the PSCCH/PSSCH from the second UE. For example, HARQ feedback information (e.g., negative acknowledgement (NACK) information or acknowledgement (ACK) information) may be received from the second UE over the PSFCH. In a step S8040, the first UE may transmit/report HARQ feedback information to the BS over PUCCH or PUSCH. For example, the HARQ feedback information reported to the BS may include information generated by the first UE based on HARQ feedback information received from the second UE. For example, the HARQ feedback information reported to the BS may include information generated by the first UE based on a preset rule. For example, the DCI may be a DCI for scheduling of SL. For example, the format of the DCI may include DCI format 3_0 or DCI format 3_1.

Referring to FIG. 12B, in an LTE transmission mode 2, an LTE transmission mode 4, or an NR resource allocation mode 2, a UE may determine an SL transmission resource within an SL resource configured by a BS/network or a preconfigured SL resource. For example, the configured SL resource or the preconfigured SL resource may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in the step S8010, the first UE having self-selected a resource in the resource pool may transmit PSCCH (e.g., Side Link Control Information (SCI) or 1st-stage SCI) to the second UE using the resource. In the step S8020, the first UE may transmit PSSCH (e.g., 2nd-stage SCI, MAC PDU, data, etc.) related to the PSCCH to the second UE. In the step S8030, the first UE may receive PSFCH related to the PSCCH/PSSCH from the second UE.

Referring to FIG. 12A or FIG. 12B, for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as a 1st SCI, a 1st-stage SCI, or a 1st-stage SCI format, and the SCI transmitted on the PSSCH may be referred to as a 2nd SCI, a 2nd SCI, a 2nd-stage SCI format. For example, the 1st-stage SCI format may include SCI format 1-A, and the 2nd-stage SCI format may include SCI format 2-A and/or SCI format 2-B.

Referring to FIG. 12A or FIG. 12B, in step S8030, a first UE may receive a PSFCH. For example, the first UE and a second UE may determine a PSFCH resource, and the second UE may transmit HARQ feedback to the first UE on the PSFCH resource.

Referring to FIG. 12A, in step S8040, the first UE may transmit SL HARQ feedback to the BS over a PUCCH and/or PUSCH.

Figure 13A:
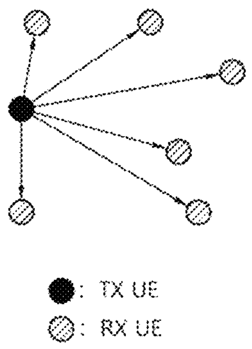
FIGS. 13A to 13C illustrate three cast types in SL communication.
Figure 13B:
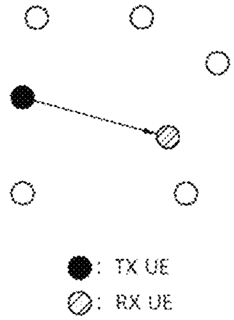
Figure 13C:
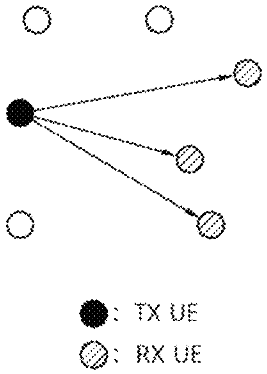

FIGS. 13A to 13C illustrate three cast types in SL communication.

Specifically, FIG. 13A shows broadcast-type SL communication, FIG. 13B shows unicast-type SL communication, and FIG. 13C shows groupcast-type SL communication. In the case of unicast-type SL communication, the UE may perform one-to-one communication with other UEs. In the case of groupcast-type SL communication, the UE may perform SL communication with one or more UEs within a group to which the UE belongs. In various embodiments of the present disclosure, SL groupcast communication may be replaced with SL multicast communication, SL one-to-many communication, etc.

<Positioning>

Figure 14:
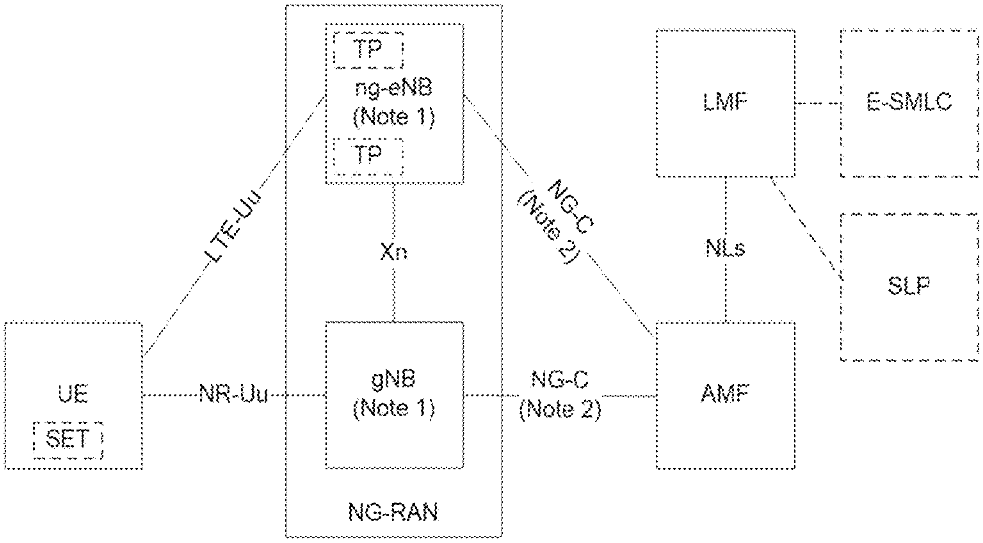
FIG. 14 illustrates an exemplary 5G system architecture capable of positioning for UEs connected to a next-generation radio access network (NG-RAN) or evolved universal terrestrial radio access network (E-UTRAN)

FIG. 14 illustrates an exemplary 5G system architecture capable of positioning for UEs connected to a NG-RAN or E-UTRAN.

Referring to FIG. 14, an AMF may receive a request for location services related to a specific target UE from other entities such as a gateway mobile location center (GMLC). Alternatively, the AMF may autonomously determine to initiate location services on behalf of the specific target UE. Thereafter, the AMF may transmit a location service request to a location management function (LMF). Upon receiving the location service request, the LMF may process the location service request and return processing results including the estimated location of the UE to the AMF. When the LMF receives a location service request from another entity other than the AMF, for example, the GMLC, the AMF may forward the processing results received from the LMF to the other entity.

A new-generation evolved Node B (ng-eNB) and gNB are network elements of the NG-RAN capable of providing measurement results for location estimation. The ng-eNB and gNB may measure radio signals for a target UE and transmit the results to the LMF. Additionally, the ng-eNB may control certain transmission points (TPs) such as remote radio heads, or positioning reference signal dedicated (PRS-dedicated) TPs for E-UTRA that support beacon systems based on a PRS.

The LMF is connected to an enhanced serving mobile location center (E-SMLC) which may enable the LMF to access the E-UTRAN. For example, the E-SMLC may enable the LMF to support Observed Time Difference of Arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure DL signals through various sources, such as the NG-RAN and E-UTRAN, different global navigation satellite systems (GNSSs), a terrestrial beacon system (TBS), WLAN wireless local access network (WLAN) access points, Bluetooth beacons, and UE barometric pressure sensors. The UE may include an LCS application, or the UE may connect to the LCS application either through communication with a connected network or through other applications integrated into the UE. The LCS application may include measurement and calculation functions necessary for determining the location of the UE. For instance, the UE may include an independent positioning function such as a global positioning system (GPS), and thus the UE may report the location thereof independently of NG-RAN transmission. The independently acquired location information may also be used as supplemental information to positioning information obtained from the network.

Figure 15:
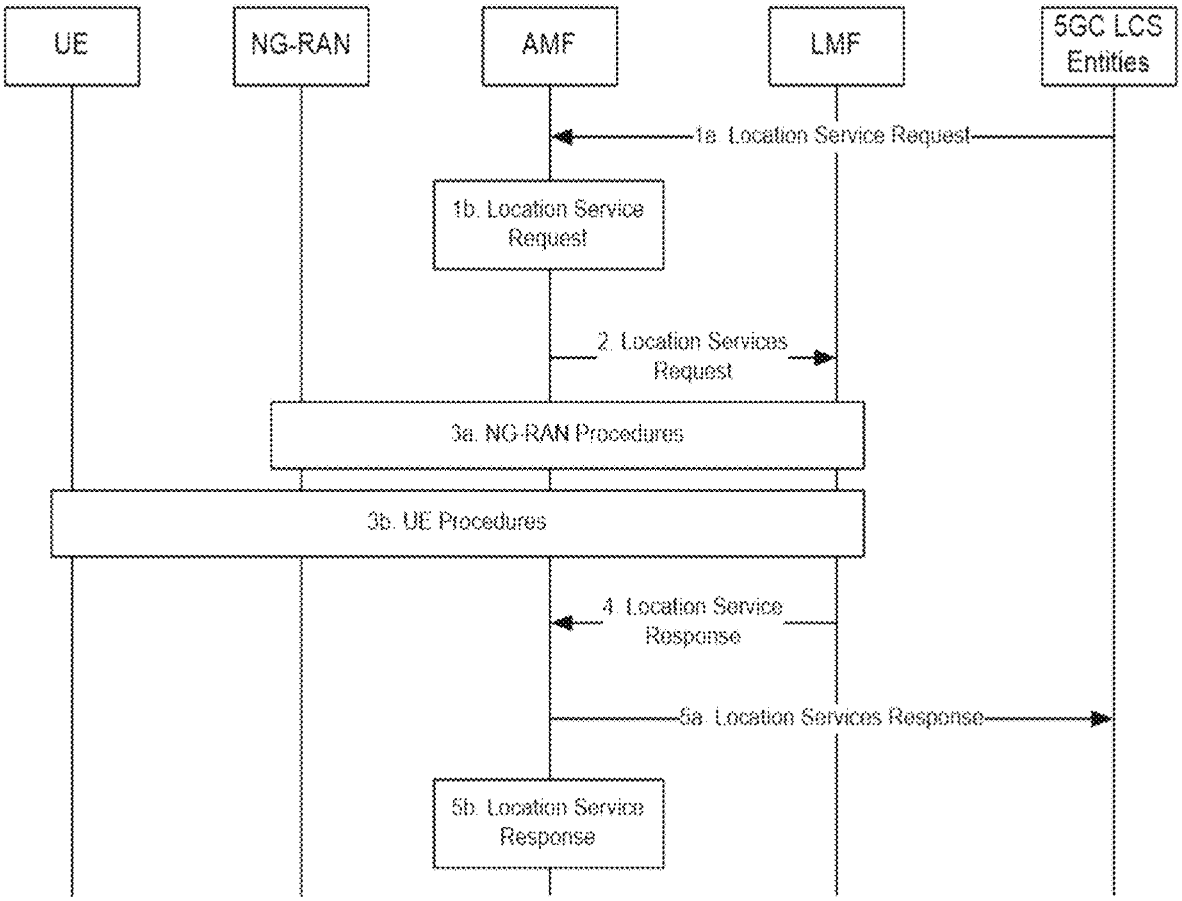
FIG. 15 illustrates an example of network implementation for measuring the location of a UE.

FIG. 15 illustrates an example of network implementation for measuring the location of a UE.

When the UE is in a connection management-idle (CM-IDLE) state, if an AMF receives a location service request, the AMF may establish a signaling connection with the UE and request a network trigger service to assign a specific serving gNB or ng-eNB. The above operation process is not illustrated in FIG. 15. That is, in FIG. 15, it may be assumed that the UE is in the connected mode. However, the signaling connection may be released by a NG-RAN while the positioning process is in progress due to signaling and data inactivity.

Referring to FIG. 15, a network operation process for measuring the location of the UE will be described in detail. In step 1*a*, a 5GC entity such as a GMLC may send a location service request to a serving AMF to measure the location of a target UE. However, even if the GMLC request no location services, the serving AMF may determine that location services are needed to measure the location of the target UE in step 1*b*. For example, the serving AMF may autonomously determine to provide location services to measure the location of the UE for an emergency call.

Thereafter, the AMF forwards the location service request to an LMF in step 2. In step 3*a*, the LMF may initiate location procedures with a serving ng-eNB and serving gNB to obtain positioning data or positioning assistance data. Additionally, in step 3*b*, the LMF may initiate location procedures for DL positioning with the UE. For example, the LMF may transmit location assistance data (e.g., assistance data defined in 3GPP TS 36.355) to the UE or obtain a location estimate or location measurement. Step 3*b* may be performed additionally after step 3*a*, or step 3*b* may be performed instead of step 3*a*.

In step 4, the LMF may provide a location service response to the AMF. The location service response may include information on whether the location of the UE is successfully estimated and the estimated location of the UE. Thereafter, if the procedures of FIG. 15 are initiated by step 1*a*, the AMF may forward the location services response to the 5GC entity such as the GMLC. If the procedures of FIG. 15 are initiated by step 1*b*, the AMF may use the location service response to provide location services related to emergency calls, etc.

Figure 16:
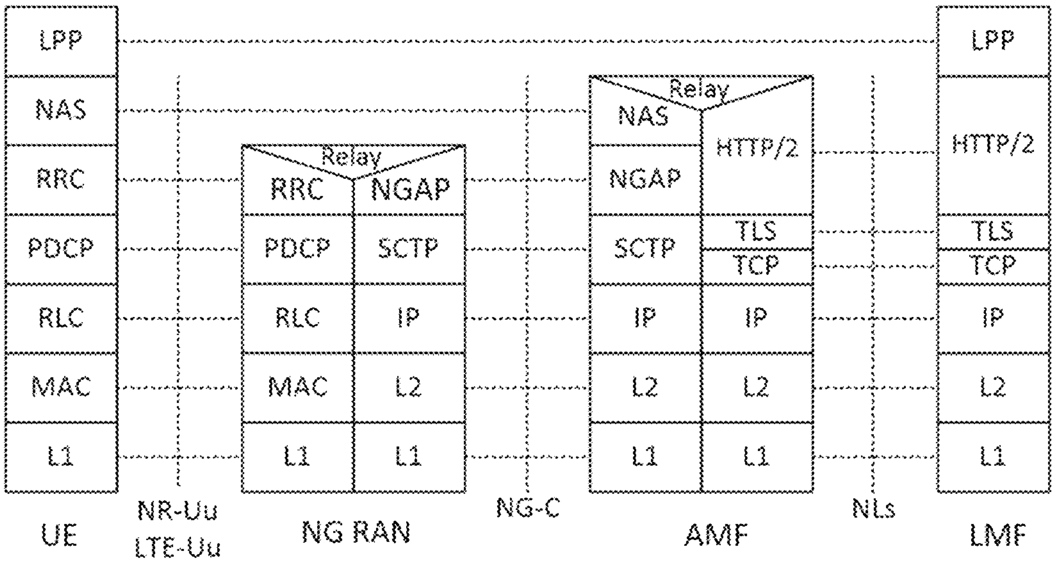
FIG. 16 illustrates exemplary protocol layers used to support Long-Term Evolution (LTE) positioning protocol (LPP) message transfer between a location management function (LMF) and a UE.

FIG. 16 illustrates exemplary protocol layers used to support LTE positioning protocol (LPP) message transfer between an LMF and a UE.

An LPP PDU may be transmitted in a NAS PDU between an AMF and a UE. Referring to FIG. 16, the LPP may be terminated between a target device (e.g., a UE in the control plane or an SUPL enabled terminal (SET) in the user plane) and a location server (e.g., an LMF in the control plane or an SUPL location platform (SLP) in the user plane). LPP messages may be delivered in a transparent PDU format through intermediate network interfaces using appropriate protocols such as a next-generation application protocol (NGAP) over the next-generation control plane (NG-C) interface, NAS/RRC over the LTE-Uu and NR-Uu interfaces. The LPP enables positioning for both NR and LTE by employing various positioning methods.

For example, a target device and a location server may exchange, through LPP, capability information therebetween, assistance data for positioning, and/or location information. The target device and the location server may exchange error information and/or indicate abort of an LPP procedure, through an LPP message.

Figure 17:
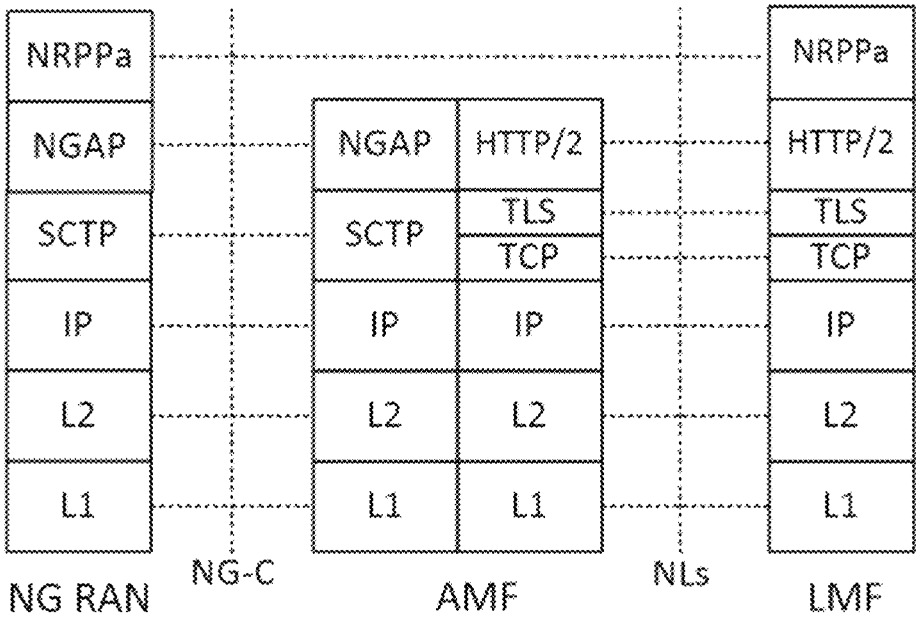
FIG. 17 illustrates exemplary protocol layers used to support NR positioning protocol annex (NRPPa) protocol data unit (PDU) transfer between an LMF and an NG-RAN node.

FIG. 17 illustrates exemplary protocol layers used to support NR positioning protocol annex (NRPPa) PDU transfer between an LMF and an NG-RAN node.

NRPPa may be used for information exchange between an NG-RAN node and an LMF. Specifically, NRPPa may exchange an enhanced cell ID (E-CID) for measurements transmitted from an ng-eNB to an LMF, data to support OTDOA positioning methods, and a cell ID and cell location ID for NR Cell ID positioning methods. Even if there is no information about related NRPPa transactions, an AMF may route NRPPa PDUs based on the routing ID of an involved LMF over an NG-C interface.

NRPPa procedures for location and data collection may be categorized into two types. The first type is a UE-associated procedure, which involves transmission of information (e.g., location measurement data) on a specific UE. The second type is a non-UE associated procedure, which involves transmission of information applicable to NG-RAN nodes and related TPs (e.g., gNB/ng-eNB/TP timing information). These two types of procedures may be supported independently or simultaneously.

<Positioning Methods>

The NG-RAN may support the following positioning methods: GNSS, OTDOA, E-CID, barometric sensor positioning, WLAN positioning, Bluetooth positioning, TBS, Uplink Time Difference of Arrival (UTDOA), and so on. Although any one of the positioning methods may be used for UE positioning, two or more positioning methods may be used for UE positioning.

(1) Observed Time Difference of Arrival (OTDOA)

Figure 18:
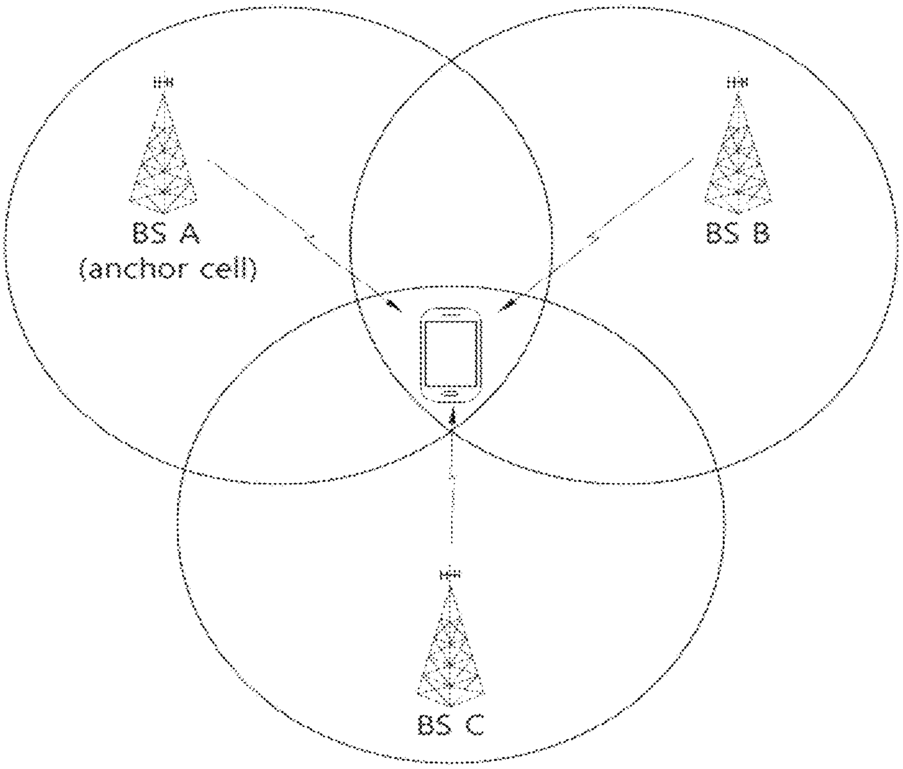
FIG. 18 is a diagram for explaining an Observed Time Difference of Arrival (OTDOA) positioning method according to an embodiment of the present disclosure.

FIG. 18 is a diagram for explaining an OTDOA positioning method according to an embodiment of the present disclosure.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

(2) E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

(3) Uplink Time Difference of Arrival (UTDOA)

UTDOA is a method of determining the location of the UE by estimating the arrival time of a sounding reference signal (SRS). When calculating the estimated SRS arrival time, the serving cell may be used as a reference cell to estimate the location of the UE based on the difference in time of arrival with respect to another cell (or BS/TP). To implement UTDOA, an E-SMLC may indicate the serving cell of a target UE and then instruct the target UE to perform SRS transmission. Additionally, the E-SMLC may provide the following configurations: periodic/non-periodic SRS, bandwidth, and frequency/group/sequence hopping.

<SL Positioning>

NR positioning discussed in 3GPP NR Release 17 supports only network-based Uu positioning and does not support positioning using SL communication. However, SL positioning is planned to be supported in 3GPP NR Release 18.

Uu positioning is a conventional method for location estimation under a connection between a target UE and a BS (gNB/LMF), but SL positioning is a new method for location estimation based on a connection between a target UE and one or more anchor UEs.

To determine anchor UEs in SL positioning, the following processes are currently being discussed.

1) Through a discovery search process, a target UE exchanges UE capability information with surrounding UEs capable of SL communication (hereinafter referred to as candidate UEs) through SL communication. In this case, basic information such as whether the discovered UEs support SL positioning is exchanged. The anchor UE is determined only when the corresponding UEs support SL positioning.
2) After exchanging the basic information, the target UE and candidate UEs determine the final anchor UE through negotiation. When performing the negotiation for SL positioning, the anchor UE may be determined only when a request to serve as the anchor UE is not rejected during the negotiation process.
3) Additionally, the anchor UE provides information to the target UE regarding whether the anchor UE is capable of ascertaining the location thereof. The anchor UE may perform absolute positioning only when the anchor UE already knows the location thereof or when the anchor UE is capable of measuring the location thereof based on Uu positioning.

<Positioning Session Identifier (ID)>

There is an LPP for positioning between a UE and an LMF. The UE and LMF may exchange information required for positioning through the LPP. In addition, NRPPa exists between a NR BS and an LMF. The BS and LMF may exchange information required for positioning through NRPPa. Additionally, LTE positioning protocol annex (LPPa) exists between an LTE BS and an LMF.

Similarly, in SL positioning, there is a sidelink positioning protocol (SLPP) between UEs. The UEs may exchange information required for positioning through the SLPP.

Specifically, the LPP is a point-to-point communication protocol between a target UE and an LMF. The target UE receives information required for positioning from the LMF through the LPP. One LPP session is used for one location acquisition request. However, multiple LPP sessions may be used for different location acquisition requests.

One LPP session consists of one or more LPP transactions, and each transaction corresponds to one LPP procedure operation. Each transaction may be executed sequentially and/or concurrently.

Multiple LPP sessions are limited to multiple location acquisition services only. The reason for this is to simultaneously support location acquisition requests for different characteristics and requirements. For example, a location acquisition service may be requested to obtain the location quickly in spite of less accuracy. On the other hand, another location acquisition service may be requested with a specific periodicity to obtain the location with high accuracy in spite of the slow speed. As described above, different LPP sessions may be created and managed depending on services with different characteristics.

Since multiple LPP sessions are limited to different location acquisition services, multiple LPP sessions are differentiated at the service level and do not need to be differentiated at the LPP level. The LPP is a protocol between the positioning initiator, which is the target UE, and the LMF. Therefore, both entities may separate/distinguish sessions based on location service requests originating from the service layer.

Table 3 below shows common fields present in the header of a conventional LPP message.

TABLE 3

| Field | Role |
|---|---|
| Transaction ID | Identify messages belonging to the same transaction |
| Transaction End Flag | Indicate when a transaction (e.g. one with periodic responses) has ended |
| Sequence Number | Enable detection of a duplicate LPP message at a receiver |
| Acknowledgement | Enable an acknowledgement to be requested and/or returned for any LPP message |

Referring to Table 3, the transaction ID is used to differentiate each transaction, and the transaction end flag is used to indicate the end of each transaction. In addition, the sequence number is used for duplicate checking of each LPP message, and the acknowledgment is used to request an acknowledgment response for a transmitted LPP message.

However, there is no parameter to differentiate LPP sessions in the common field of the conventional LPP message. There are parameters for distinguishing transactions within a session and additional parameters for duplication checks and acknowledgment requests.

The SLPP supports a point-to-multipoint communication protocol between the target UE and other surrounding UEs, unlike the conventional LPP. In this case, the other UEs may become anchor UEs responsible for transmitting/receiving a sidelink positioning reference signal (SL-PRS). If there is only one anchor UE, one-to-one communication is also possible. Additionally, other types of UEs may exist in addition to the target UE and anchor UE. For example, a server UE may exist to perform location calculation, and so on. In this way, multiple UEs may be configured into one SL positioning group.

For example, anchor UEs may be connected to multiple target UEs rather than one target UE. In other words, a single anchor UE may perform SL-PRS transmission and reception with multiple target UEs. Therefore, multiple SLPP sessions may be created simultaneously from the perspective of a specific UE. In this case, since anchor UEs do not have service requirement information from the service layer for actual location acquisition, it is difficult to distinguish or differentiate multiple SLPP sessions when the multiple SLPP sessions are created.

Additionally, the target UE may use multiple SLPP sessions for faster location acquisition. In this case, SLPP transaction information provided by the target UE may be different from previous transaction information. In this case, upon receiving a new transaction, the anchor UEs may determine the corresponding transaction information as invalid if it is not allowed to distinguish sessions, which leads to inability to provide smooth location acquisition services.

Each transaction may be executed not only sequentially but also in parallel. The validity of each transaction may be determined based on information received from the previous transaction. Therefore, when supporting multiple sessions, conventional parallel execution based on transaction information is not possible. That is, the information from the previous transaction needs to be exchanged, and thus, there occurs a time delay in acquiring the location.

Therefore, the SLPP requires a method to effectively support multiple sessions, compared to the conventional LPP.

The present disclosure proposes SLPP session management based on a session ID.

Specifically, when one or more SLPP sessions are created for a request of SL positioning services, each created SLPP session has an independent session ID. The SLPP session may be created by a device capable of hosting/managing the SL positioning service, such as a target UE, server UE, or LMF.

Specifically, as shown in Table 4 below, a session ID field is added to common fields in the header of an SLPP message, and sessions are distinguished at the SLPP level.

TABLE 4

| Field | Role |
|---|---|
| Session ID | Identify SLPP session |
| Transaction ID | Identify messages belonging to the same transaction |
| Transaction End Flag | Indicate when a transaction (e.g. one with periodic responses) has ended |
| Sequence Number | Enable detection of a duplicate LPP message at a receiver |
| Acknowledgement | Enable an acknowledgement to be requested and/or returned for any LPP message |

As described above, session information are shared by all devices (LMF and/or UE) participating in the SLPP session, and thus, all devices may recognize/distinguish the sessions.

Specifically, the SLPP procedure/transaction/message transfer is performed based on the SLPP session ID. In other words, SLPP messages are delivered between UEs using the SLPP session ID. In this case, each transaction ID is managed separately within the corresponding SLPP session ID.

Figure 19:
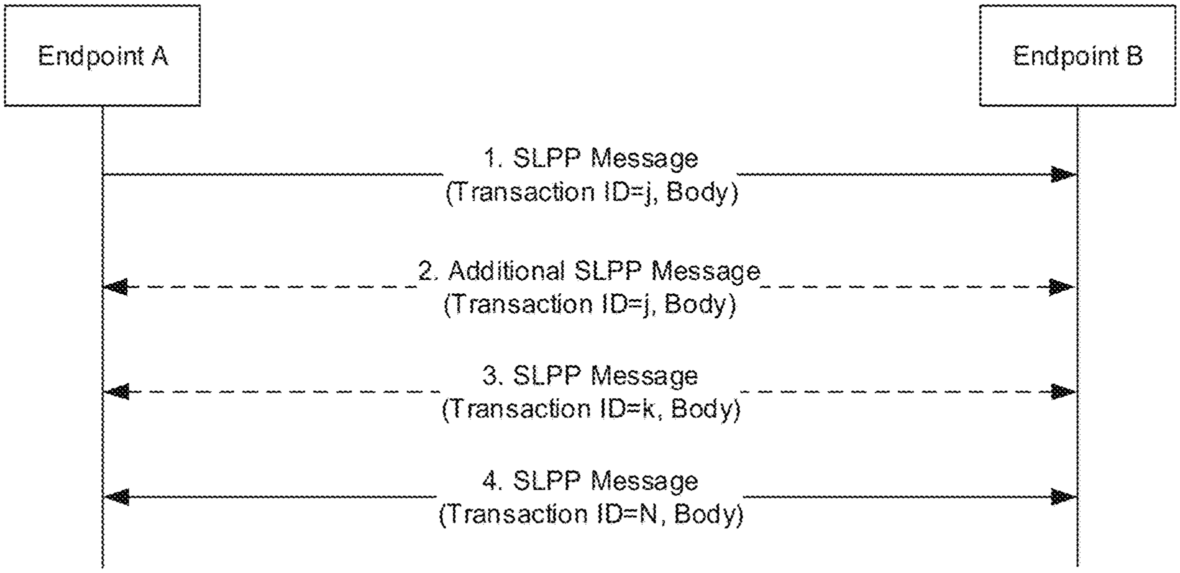
FIG. 19 illustrates an exemplary sidelink positioning protocol (SLPP) session operation performed according to an embodiment of the present disclosure.

FIG. 19 illustrates an exemplary SLPP session operation performed according to an embodiment of the present disclosure.

Referring to FIG. 19, upon receiving an LCS request, endpoint A transmits an SLPP message to another endpoint, endpoint B to initialize an SLPP session. In this case, the SLPP message includes a session identifier (SLPP session ID) assigned for initial SLPP transaction j.

Thereafter, endpoint A and endpoint B may exchange additional messages to continue the SLPP transaction. Each endpoint may initiate additional transactions by transmitting additional SLPP messages. The session is terminated by final transaction N, in which SLPP messages are exchanged between the two endpoints.

All configuration messages within the same SLPP session contain the same SLPP session ID. In each SLPP transaction, all configuration messages contain the same SLPP transaction ID. The last message transmitted in each SLPP transaction has IE endTransaction set to TRUE. Additionally, SLPP transactions occurring in parallel use different SLPP transaction IDs. The ID of a completed SLPP transaction may be reused at any time after it is known that the final message of a previous SLPP transaction with the same ID is received.

On the other hand, the body of an SLPP message contains the content required to perform the SLPP procedure and is defined by the following message types:

1) Request Capabilities;
2) Provide Capabilities;
3) Request Assistance Data;
4) Provide Assistance Data;
5) Request Location Information;
6) Provide Location Information;
7) Abort; and
8) Error.

For example, if the SLPP message type is Error, the UE performs error handling operations using the SLPP session ID. For example, in the conventional LPP error detection process, SLPP error detection may be performed for multiple SLPP sessions using the SLPP session ID. Additionally, a specific SLPP session may be terminated by considering the SLPP session ID.

Figure 20:
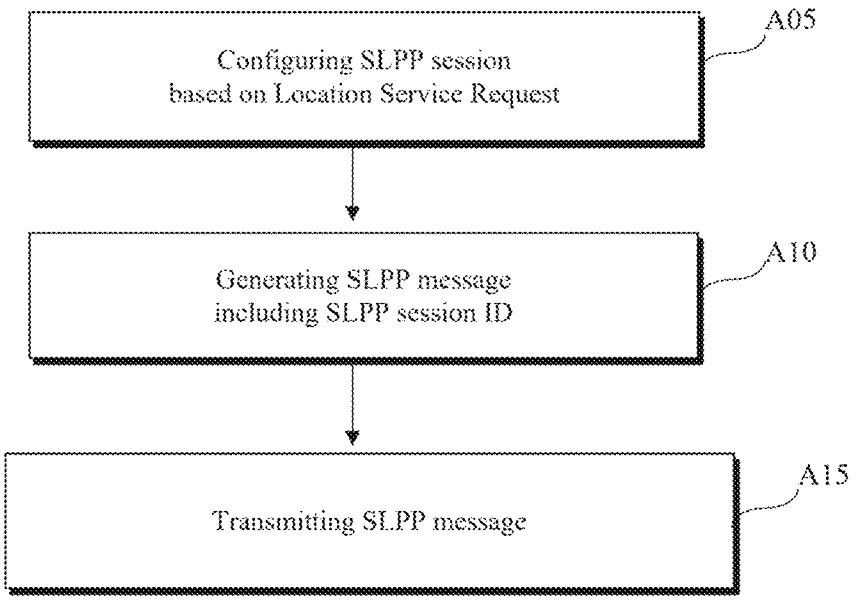
FIG. 20 is a flowchart illustrating a process of transmitting an SLPP message according to an embodiment of the present disclosure.

FIG. 20 is a flowchart illustrating a process of transmitting an SLPP message according to an embodiment of the present disclosure.

Referring to FIG. 20, in step A05, a UE (e.g., anchor UE) establishes at least one SLPP session with at least one target UE based on a location service request.

Thereafter, to perform a transaction in the corresponding SLPP session, the UE generates an SLPP message related to the at least one SLPP session in step A10. In this case, the header of the SLPP message further includes at least one of an end flag of the at least one SLPP transaction, a sequence number of the SLPP message, or an ACK response request indicator of the SLPP message. According to the present disclosure, the SLPP message includes at least one SLPP session ID for identifying the at least one SLPP session and at least one SLPP transaction ID for identifying the at least one SLPP transaction belonging to the at least one SLPP session.

In step A15, the UE transmits the SLPP message to the at least one target UE. If there are a plurality of SLPP sessions, an SLPP transaction related to a first SLPP session and an SLPP transaction related to a second SLPP session are distinguished by the SLPP session ID of each SLPP session. If the first and second SLPP sessions have the same SLPP session ID, the SLPP transaction related to the first SLPP session and the SLPP transaction related to the second SLPP 20 session are distinguished by the SLPP transaction ID of each SLPP transaction. The SLPP transaction related to the first SLPP session and the SLPP transaction related to the second SLPP session may be performed in parallel.

Preferably, information on the at least one SLPP session ID may be provided in advance to one or more UEs participating in the at least one SLPP session, including the at least one target UE.

The above-described embodiments are combinations of the components and features of the present disclosure in specific forms. Each component or feature should be considered optional unless explicitly mentioned otherwise. Each component or feature may be implemented without being combined with other elements or features. Furthermore, some components and/or features may be combined to implement embodiments of the present disclosure. The order of operations described in the embodiments of the present disclosure may be rearranged. Some components or features of one embodiment may be included in another embodiment, or the components or features may be replaced with related components or features of the other embodiment. It is obvious that claims that are not explicitly cited in the appended claims may be combined to form an embodiment or included as a new claim by amendment after filing.

It is evident to those skilled in the art that the present disclosure could be realized in various specific forms within the scope of the features of the present disclosure. Therefore, the detailed description above should not be interpreted restrictively in all respects but should be considered as illustrative. The scope of the present disclosure should be determined by a reasonable interpretation of the appended claims, and all changes within the equivalent scope of the present disclosure are encompassed within the scope of the present disclosure.

The present disclosure may be used in a terminal, base station, or other equipment of a wireless mobile communication system.

The invention claimed is:

1. A method comprising:

based on a location service request being received, initiating, by a first User Equipment (UE), at least one positioning protocol session with at least one second UE;

generating, by the first UE, a positioning protocol message related to the at least one positioning protocol session; and transmitting the positioning protocol message to the at least one second UE, wherein the positioning protocol message includes at least one positioning protocol session identifier for identifying the at least one positioning protocol session and at least one positioning protocol transaction identifier for identifying at least one positioning protocol transaction belonging to the at least one positioning protocol session.

2. The method of claim 1, further comprising:

transmitting, by the first UE, information on the at least one positioning protocol session identifier to one or more UEs participating in the at least one positioning protocol session including the at least one second UE.

3. The method of claim 1, wherein based on there being a plurality of positioning protocol sessions, a positioning protocol transaction related to a first positioning protocol session and a positioning protocol transaction related to a second positioning protocol session are distinguished by positioning protocol session identifiers of the positioning protocol sessions, and based on the positioning protocol session identifiers being identical to each other, the positioning protocol transaction related to the first positioning protocol session and the positioning protocol transaction related to the second positioning protocol session are distinguished by related positioning protocol transaction identifiers.

4. The method of claim 3, wherein the positioning protocol transaction related to the first positioning protocol session and the positioning protocol transaction related to the second positioning protocol session are performed in parallel.

5. The method of claim 1, wherein a header of the positioning protocol message further includes at least one of an end flag of the at least one positioning protocol transaction, a sequence number of the positioning protocol message, or an acknowledgement (ACK) response request indicator of the positioning protocol message.

6. A first user equipment (UE) comprising:

at least one processor; and at least one memory storing instructions thereon that, when executed by the at least one processor, cause the first UE to perform at least:

based on a location service request being received, initiating at least one positioning protocol session with at least one second UE;

generating a positioning protocol message related to at least one positioning protocol session; and transmitting the positioning protocol message to the at least one second UE, wherein the positioning protocol message includes at least one positioning protocol session identifier for identifying the at least one positioning protocol session and at least one positioning protocol transaction identifier for identifying at least one positioning protocol transaction belonging to the at least one positioning protocol session.

7. The first UE of claim 6, wherein the first UE transmits information on the at least one positioning protocol session identifier to one or more UEs participating in the at least one positioning protocol session including the at least one second UE.

8. The first UE of claim 6, wherein based on there being are a plurality of positioning protocol sessions, a positioning protocol transaction related to a first positioning protocol session and a positioning protocol transaction related to a second positioning protocol session are distinguished by positioning protocol session identifiers of the positioning protocol sessions, and based on the positioning protocol session identifiers being identical to each other, the positioning protocol transaction related to the first positioning protocol session and the positioning protocol transaction related to the second positioning protocol session are distinguished by related positioning protocol transaction identifiers.

9. The first UE of claim 6, wherein the positioning protocol transaction related to the first positioning protocol session and the positioning protocol transaction related to the second positioning protocol session are performed in parallel.

10. The first UE of claim 6, wherein a header of the positioning protocol message further includes at least one of an end flag of the at least one positioning protocol transaction, a sequence number of the positioning protocol message, or an acknowledgement (ACK) response request indicator of the positioning protocol message.

11. A non-transitory computer-readable storage medium comprising program instructions that, when executed by a processor, cause a first user equipment (UE) to perform at least the following:

based on a location service request being received, initiating at least one positioning protocol session with at least one second UE;

generating a positioning protocol message related to the at least one positioning protocol session; and transmitting the positioning protocol message to the at least one second UE, wherein the positioning protocol message includes at least one positioning protocol session identifier for identifying the at least one positioning protocol session and at least one positioning protocol transaction identifier for identifying at least one positioning protocol transaction belonging to the at least one positioning protocol session.

* * * * *